US011356749B2

(12) United States Patent
Mekuria et al.

(10) Patent No.: US 11,356,749 B2
(45) Date of Patent: *Jun. 7, 2022

(54) TRACK FORMAT FOR CARRIAGE OF EVENT MESSAGES

(71) Applicant: CodeShop, B.V., Amsterdam (NL)

(72) Inventors: Rufael Negatu Mekuria, Amsterdam (NL); Arjen Wagenaar, Amsterdam (NL); Dirk Griffioen, Arnhem (NL)

(73) Assignee: Codeshop, B.V., Amsterdam (NL)

( * ) Notice: Subject to any disclaimer, the term of this patent is extended or adjusted under 35 U.S.C. 154(b) by 0 days.

This patent is subject to a terminal disclaimer.

(21) Appl. No.: 17/205,554

(22) Filed: Mar. 18, 2021

(65) Prior Publication Data

US 2021/0211782 A1    Jul. 8, 2021

Related U.S. Application Data

(63) Continuation of application No. 16/699,789, filed on Dec. 2, 2019, now Pat. No. 10,979,784.

(51) Int. Cl.
| | |
|---|---|
| *H04N 9/80* | (2006.01) |
| *H04N 21/845* | (2011.01) |
| *H04L 65/60* | (2022.01) |
| *H04N 21/854* | (2011.01) |
| *H04N 5/92* | (2006.01) |

(52) U.S. Cl.
CPC ....... *H04N 21/8456* (2013.01); *H04L 65/601* (2013.01); *H04N 21/85406* (2013.01)

(58) Field of Classification Search
CPC .............. H04L 65/601; H04N 21/8456; H04N 21/85406
USPC ................ 386/241, 244, 245, 278, 626, 239
See application file for complete search history.

(56) References Cited

U.S. PATENT DOCUMENTS

2010/0150105 A1\* 6/2010 Miao .................... H04L 65/1083
370/331
2019/0281100 A1\* 9/2019 Lo ......................... H04N 21/812

\* cited by examiner

*Primary Examiner* — Robert Chevalier
(74) *Attorney, Agent, or Firm* — Pablo Meles

(57) ABSTRACT

In accordance with an example embodiment there is at least a method and apparatus to perform operations including identifying, by a media streaming device, samples in an event message track enclosing one or more Event Message Boxes containing information about a splice point, and identifying that all or one or more Event Message Boxes are active at the sample presentation time of the sample enclosing the Event Message Boxes, and parsing the event message track as an ISO base Media Formatted Track. In accordance with another example embodiment there is a method and apparatus to perform operations including parsing, by a media streaming device, one or more Event Message Boxes in a media track where the Event Message Boxes contains information about a split point, identifying time based events with a duration and presentation time, the operations including instantiating an event message track as an ISO Base Media Format track.

20 Claims, 9 Drawing Sheets

20

40

50

80

TRACK FORMAT FOR CARRIAGE OF EVENT MESSAGES

CROSS-REFERENCE TO RELATED APPLICATIONS

This application is a continuation application of U.S. application Ser. No. 16/699,789 filed Dec. 2, 2019, the entire contents of which is incorporated herein by reference.

STATEMENT REGARDING FEDERALLY-SPONSORED RESEARCH OR DEVELOPMENT

Not applicable

INCORPORATION BY REFERENCE

Not applicable

FIELD OF THE INVENTION

The teachings in accordance with the exemplary embodiments relate generally to the storage, transmission and identification of media related events and Event Message Boxes.

DESCRIPTION OF THE RELATED ART

This section is intended to provide a background or context to the various embodiments that are recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Broadcast related events and time synchronous information are often embedded in the MPEG-2 Transport stream format, as defined by the Moving Picture Experts Group in ISO/IEC 13818-1. This format is used by international standards for broadcast, such as Advanced Television Systems Committee ATSC in the United States or Digital Video Broadcasting (DVB) in Europe. For example, event and synchronous information can be carried in commands based on SCTE-35 as developed by the Society of Cable and Telecommunication Engineers (SCTE) and standardized by the American National Standards Institute (ANSI). These commands can be carried in MPEG-2 TS by multiplexing it in the stream using its own program identifier (PID). Such commands based on SCTE-35 can be used for carrying information related to program content offering and splicing logic. It is well-known that MPEG-2 Transport streams have been designed for digital broadcast such as terrestrial, satellite or cable, but are less than optimal for Internet based streaming. For Internet based streaming, fragmented MPEG-4 using ISO Base Media file format as defined by the Common Media Application Track Format (CMAF) is a popular format.

The CMAF standard can be used by different streaming protocols including MPEG DASH defined by ISO/IEC 23009-1 and HLS defined in IETF RFC 8216 for the track. Compared to MPEG-2 Transport stream, CMAF or fragmented MPEG-4 tracks enable segment boundary identification between fragments that make it easy to retransmit in case of errors, which often happens during the Internet based transmission. Further, the structure imposed by the fragmented MPEG-4 format also allows for efficient encryption techniques to be used for Digital Rights Management such as defined by the MPEG standard for common encryption (CENC). However, contrary to MPEG-2 Transport stream, carriage of broadcast events and timed metadata are much more challenging in CMAF as CMAF does not allow multiplexing of tracks, as available in MPEG-2 Transport stream. Further many of the fields used for storing and identifying broadcast event and timed metadata in MPEG-2 TS are not available in fragmented MPEG-4 such as the private data field. This gives many problems in dealing with broadcast events in fragmented MP4 and Common Media Application Track Format (CMAF).

SUMMARY

In an exemplary embodiment, there is a method, including identifying, by a media streaming device, samples, enclosing one or more Event Message Boxes in an event message track associated to one or more media streaming tracks, and at least one of storing and/or transmitting, by the media streaming device, the Event Message Boxes as top level boxes.

In an exemplary embodiment, there is an apparatus including at least one processor and at least one memory including computer program code, where the at least one memory and the computer program code are configured, with the at least one processor, to cause the apparatus to at least determine, by a media streaming device, a sample containing one or more Event Message Boxes and at least one of store and/or transmit, by the media streaming device, the Event Message Boxes as top level boxes in a media track.

In another exemplary aspect, there is an apparatus including a means for determining, by a parser device, one or more top level Event Message Boxes in a media track and at least one of storing and/or transmitting, by the media streaming device, the Event Message Boxes enclosed in samples in an event message track format.

In accordance with the example embodiment as described in the paragraph above, at least the means for determining and the means for storing and transmitting comprises a non-transitory computer readable medium including computer program code, and the computer program code executed by at least one processor.

In another exemplary aspect a method includes receiving, by way of a media streaming device, a plurality of samples, where each sample encloses zero or more Event Message Boxes with a presentation time equal to the presentation time of the sample enclosing one or more Event Message Boxes. The method further includes identifying all currently active events at the presentation time and duration of that sample by parsing the one or more Event Message boxes.

In yet another exemplary aspect, there is an apparatus including at least one processor; and at least one memory including computer program code, where the at least one memory and the computer program code are configured to cause the apparatus to at least identify, with a parser device, a plurality of Event Message Boxes enclosed in samples in an event message track format, where one or more of the Event Message Boxes have a presentation time equal to the enclosed sample presentation time, where each Event Message Box identifies a broadcast related event associated the sample presentation time, and parse, with the parser device, the plurality of Event Message Boxes to determine all active broadcast events on the sample presentation time. The apparatus is further configured to perform at least one of store or transmit the Event Message Boxes enclosed as top level boxes in a media track format.

In yet another exemplary aspect, there is a method, including the steps of determining if a media track or segment contains one or more event message boxes, storing a sample associated with the one or more event message boxes, enclosing in this sample all Event Message Boxes active in the duration of those sample if any, and based on at least the determined presentation time, duration, value and schemeIdUri identical to Event Message Boxes enclosed in prior samples can be detected. The method can further include the steps of creating new samples for Event Message Boxes with a later presentation time, and one of storing or transmitting the samples in an event Message Track format, where the Event Message Boxes are enclosed in samples.

In yet another exemplary, there is an apparatus including with a receiver using a parser device that receives a plurality of samples enclosing one or more Event Message Boxes, where each Event Message Box identifies one or more broadcast events active at a sample presentation time, an identifier for identifying that a sample contains Event Message Box data, and an identifier for identifying the position in a media track or segment for inserting a top level box using an announce time. The apparatus further includes a means for one of storing and transmitting the top level Event Message Box to a media track file or segment in advance of the presentation time using the announce time.

In accordance with the example embodiment as described in the paragraph above, at least the means for receiving, parsing and determining comprises a non-transitory computer readable medium including computer program code, and the computer program code executed by at least one processor.

BRIEF DESCRIPTION OF THE DRAWINGS

The accompanying figures, in which like reference numerals refer to identical or functionally similar elements throughout the separate views, and which together with the detailed description below are incorporated in and form part of the specification, serve to further illustrate various embodiments and to explain various principles and advantages all in accordance with the present disclosure, in which.

DETAILED DESCRIPTION

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Before explaining the methods and systems of the embodiments herein, a more detailed explanation of the various file formats and/or tracks will provide additional clarification with respect to FIGS. 3, 4, 5, and 8.

Figure 3:
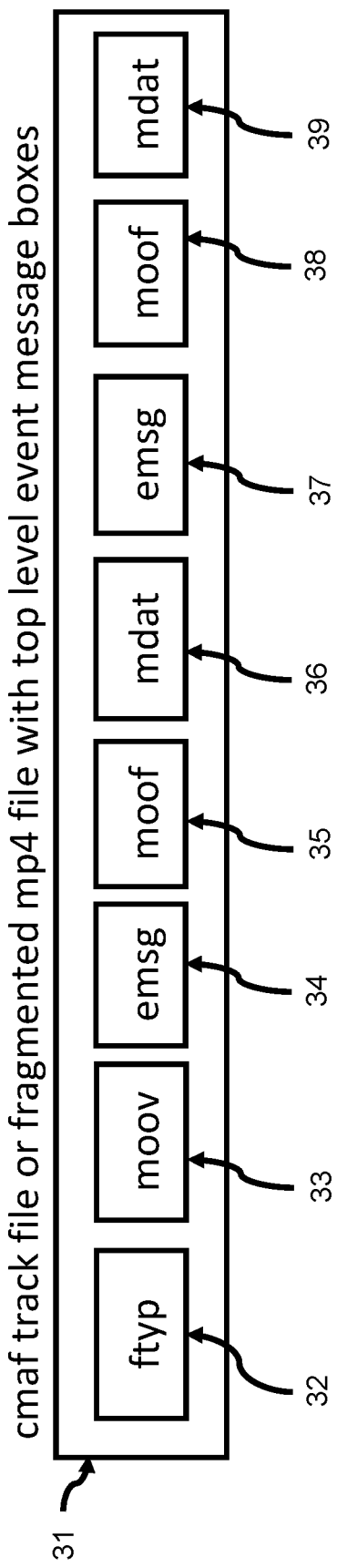
FIG. 3. is a representation illustrating a structure of a CMAF track file with top level event message boxes in accordance with the embodiments FIG. 4. is a representation illustrating a CMAF Header file to be used with fragmented event message track in accordance with the embodiments.

The structure of a CMAF track file with top level event message boxes in accordance with the embodiments illustrated in FIG. 3 includes initialization data enclosed in the moviebox, while the media samples are in the CMAF chunks in the mdat and moof boxes. The emsg boxes are placed in front of a chunk where they can be easily accessed when the chunk is delivered to a player or client.

Figure 4:
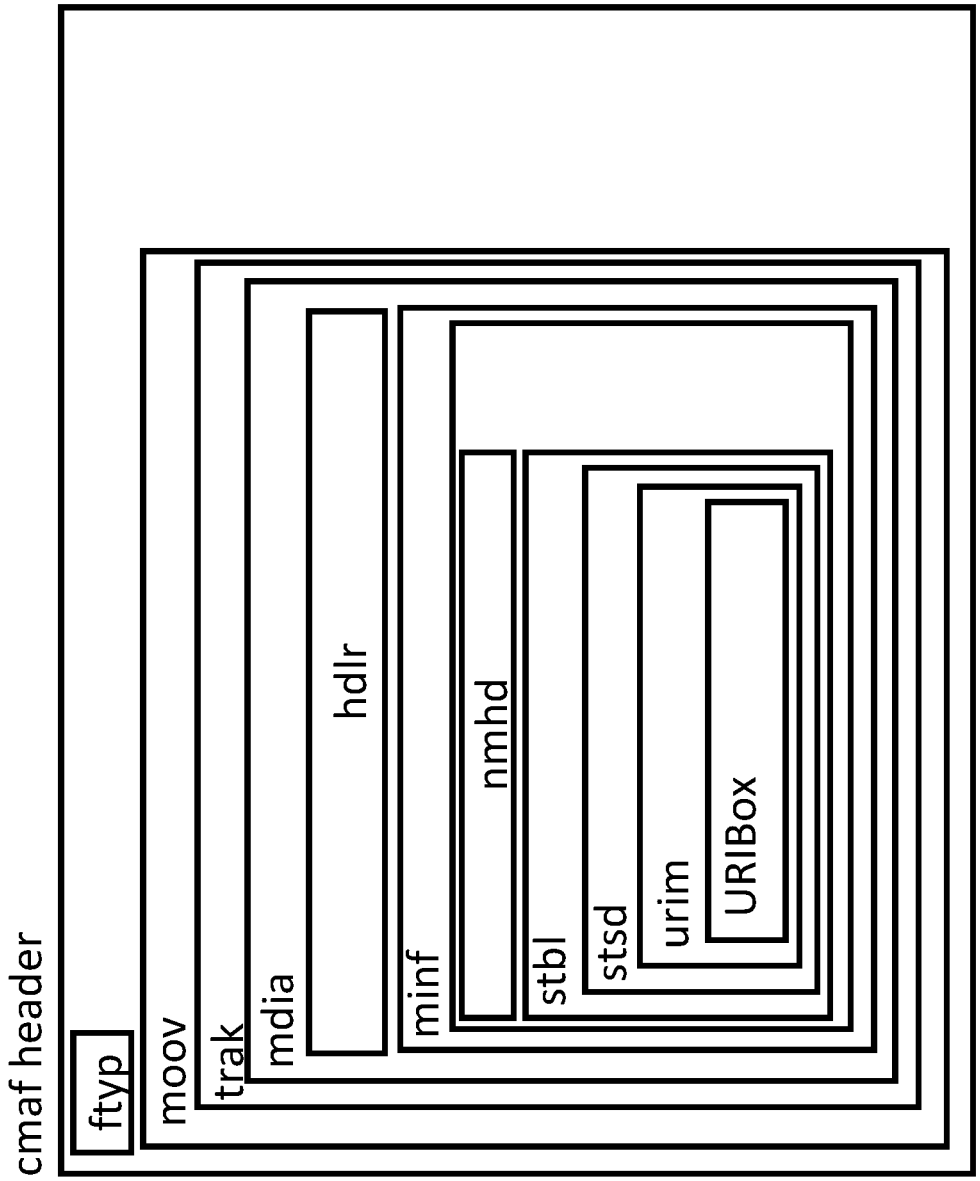

The CMAF Header file to be used with fragmented event message track in accordance with the embodiments shown in FIG. 4 contains an ftyp box and a MovieBox, the ftyp box signals the brand information of the track. The MovieBox carries the information about the track, and encloses the trak box, that encloses a mdia box, that contains the minf box that contains both the null media header and the sample description entry stsd that in this track header.

Figure 5:
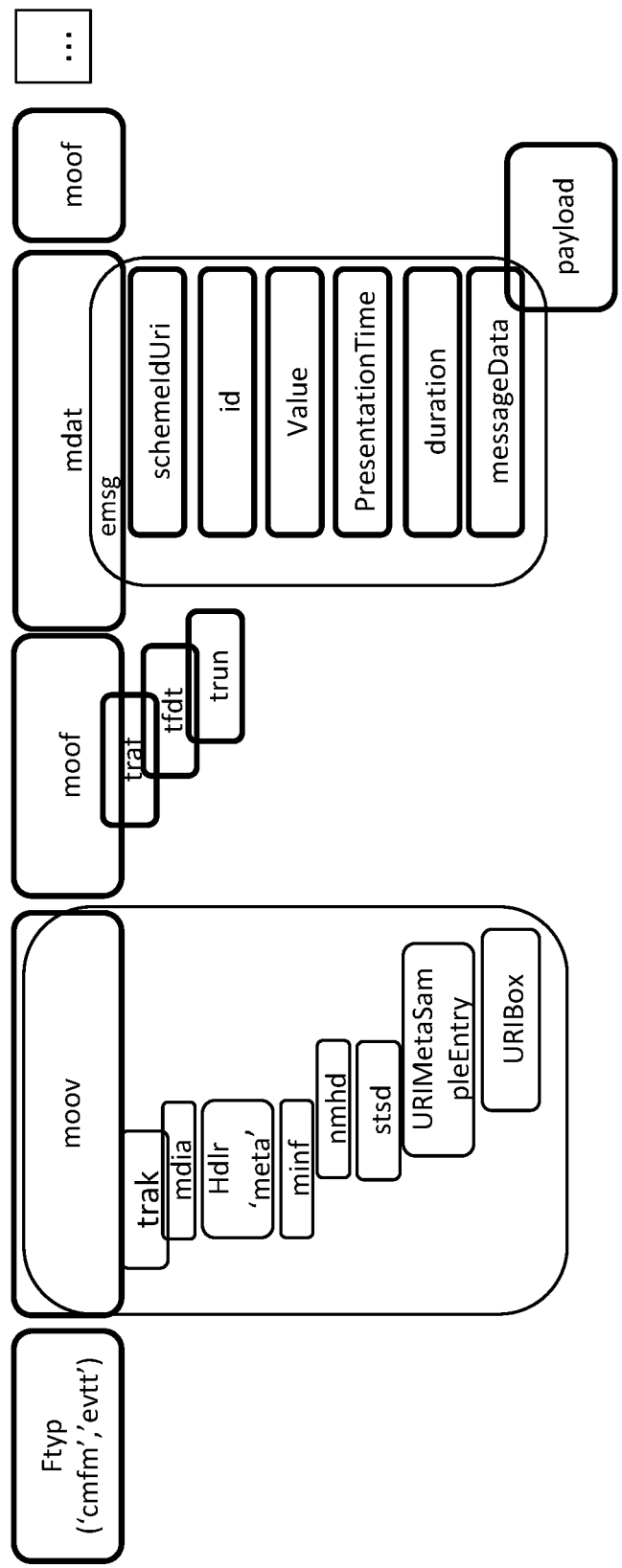
FIG. 5. is a representation illustrating an Event Message track that uses Movie Fragments, the event message track carrying event messages and event message empty cue in accordance with the embodiments.

The Event Message track illustrated in FIG. 5 uses Movie Fragments and the event message track carries event messages and event message empty cue in accordance with the embodiments. In this track format structure, the mdat box encloses the emsg event message boxes as samples. The event message boxes carried as samples are referenced from the preceding movie fragment box. The different emsg or event message boxes have payload carrying data relating to the media presentation. Each Event Message box also has an id a schemeIdUri and a value field that can be used detect the specific event instance. By encapsulating the event message box structures in samples, the event message box lies on the timeline of the ISOBMFF media track.

Figure 8:
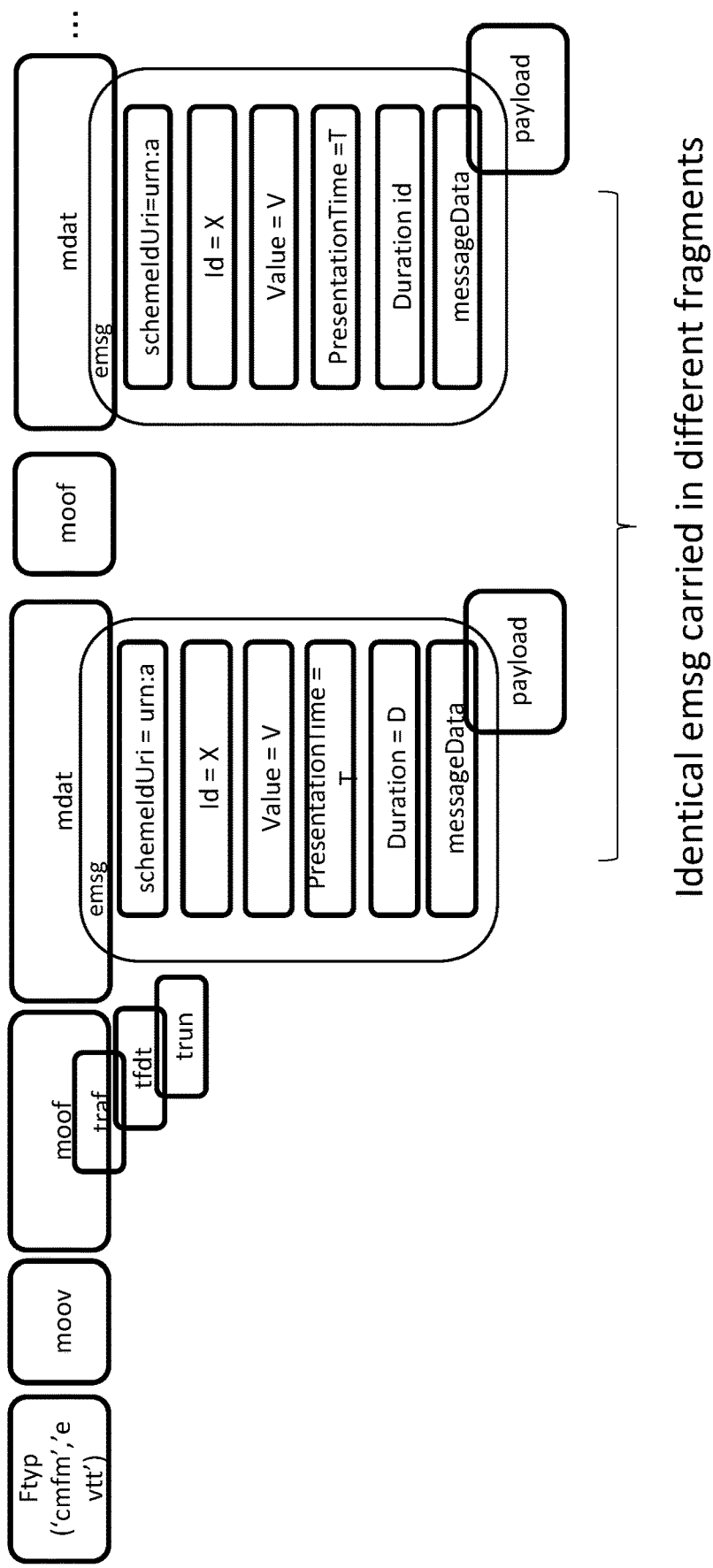
FIG. 8. is a representation illustrating an Event Message Track using movie fragments.

The Event Message Track of FIG. 8 uses movie fragments. In this example event message box and event message box empty cue are duplicated across sample payloads in different fragments. This duplicate carriage in samples in different fragments facilitates carriage of events with a duration longer than the fragment duration.

The embodiments herein discloses methods for identifying, parsing (see step 9 of FIG. 1), storing and transmitting event messages in ISO Base Media File Format tracks. The ISO Base Media File Format is specified in ISO/IEC 14496-12 and used by many media streaming devices. The ISO Base media file format defines box structures for carriage of samples in Movie Data boxes mdat and other boxes such as the MovieFragment box and MovieBox that can be used to carry indexes to the samples and track specific information. ISO Base media file format tracks have a well-defined timeline of samples carrying media to play them back at their associated presentation time, that can be derived from the sample table structures and edit lists.

Event Messages Boxes identified by a four character code such as 'emsg' as the DASHEventMessageBox defined in ISO/IEC 23009-1. On the other hand, an event message track can have their own timeline which may be different from the ISO Base Media File format track. This makes it tricky to carry such information in ISO Based Media file format. For example, event messages may have zero duration or an unknown duration, event messages may be overlapping, and event messages may have different sub-schemes. Carriage of Event message boxes using a top level box such as the DASHEventMessageBox 'emsg' in segments is also defined in ISO/IEC 23009-1, however when storing segments as a track, this does not enable easy seeking throughout the file to find the event message, moreover this carriage method makes it easy to miss event messages that are active which is a common problem to today when using event messages using top-level event message boxes such as the DASHEventMessageBox. This is because many media streaming devices implement the functionality of the ISO Base Media file format for seeking in tracks using sample table and or track run boxes for detecting and rendering active samples. By storing an event as a top level box, the timeline of the ISO Based media file format cannot be used effectively for seeking a Event Message and detecting active event messages. For example, a client may start playing segments at a time, at that time the event message is active, but it was signaled in a prior fragment. There is no way for the client to retrieve or detect this event, other than downloading all segments in the presentation looking for event message boxes, which is obviously not a good approach as it would waste bandwidth and player resources.

The event message track disclosed here overcomes these problems by defining methods for identifying, parsing, storing and transmitting event message boxes in ISO Base media file format samples using a specific track format that links the timeline of the event messages to the timeline of the track file. To provide illustrative description of this event message track format we detail the concepts defined in ISO Based Media File Format, and the Common Media Application Track Format first in the following text.

The ISO Base Media File format (ISOBMFF) is defined in ISO/IEC 14496-12 and defines box structures for carriage of media content in tracks. These are ISO Base Media File Format Box structures, examples include the MovieBox 'moov' carrying track specific metadata and indexing information or the MediaData Box 'mdat' carrying sample information that include the physical media samples, often in a compressed format. An ISOBMFF sample is not the same as a media sample, in the case for audio for example it is common to store packets containing and integral number of compressed samples. For example, in the case of MPEG-4 advanced audio codec (aac) carried in the ISO Base Media File Format samples may contain packets containing 1024 or 512 or another integral number of audio samples. Throughout this text, a sample refers to a sample as defined in the ISO Base media file format, i.e. an ISOBMFF sample. When we refer to an ISO Base Media File Formatted Track we refer to a track structure byte stream or bitstream conforming to the ISO Based Media File Format, possibly stored as a file or transmitted over a network. An ISO Base Media File Formatted track can be an ISO Base Media File Formatted file carrying a single media track. The ISO base media file format, including ISO Base Media File Formatted tracks are supported by many media streaming devices, the media streaming devices can be smart televisions, tablet computers, personal computers, media streaming servers, content delivery networks or other components with similar functionality for transmitting, receiving and processing of media streaming content. The ISO Base media file format defined the MovieBox (moov) box structure to carry information about the content of the tracks. The MovieBox contains different boxes to describe the track structure, using boxes like track header tkhd box to carry the data about different tracks. The Track Header tkhd in the MovieBox at some level a sample table stbl box that includes a SampleDescription box identified by the four character code 'stsd' that describes what kind of data is enclosed in the track file in the sampleEntry structure defined. The other boxes in the sample table define how the samples are active and need to be presented at different times can be found in the file using structures like time to sample stts, composition time to sample ctts and indexed by byte offsets calculated from mapping a sample to a sample chunk in the stsc sample to chunk box indexing into a contiguous block of samples, then calculating a byte offset by stco sample to chunk offset, and stsz or stz2 containing sample sizes to calculate the final byte offset for identifying the sample. The ISO Base media file format is typically used for carriage of audio and video where media is not overlapping. Samples are often coded by durations and the assumption that samples are not overlapping is one of the fundamentals of the ISO Base media file format. Another form of the ISO Base media file format uses Movie Fragments which consist of fragments containing a MovieFragment Box 'moof' and an MovieData 'mdat' box. In this case the fragment or cmaf fragment may also have an optional segment type box 'styp' box appended that can be used to signal a brand.

Such fragmented tracks containing Movie Fragments can also not have overlapping fragments to be valid according to the specification and be played back properly. By using track fragment decode time 'tfdt' the earliest decode time of fragments is signaled which in many case equals the earlies presentation time of the fragment. One important design requirement of the ISO Base Media File format is to enable conversion between progressive files which are files not using movie fragment and fragmented files using movie fragments. This is because movie fragments may be desirable for streaming, while progressive files may be better for localized playback. The event message track is an ISO Base media file format track with specific properties and constraints on the samples and carriage of event message box structures 'emsg' in samples. The event message track can exist in fragmented or progressive form, i.e with or without Movie Fragments.

Figure 1:
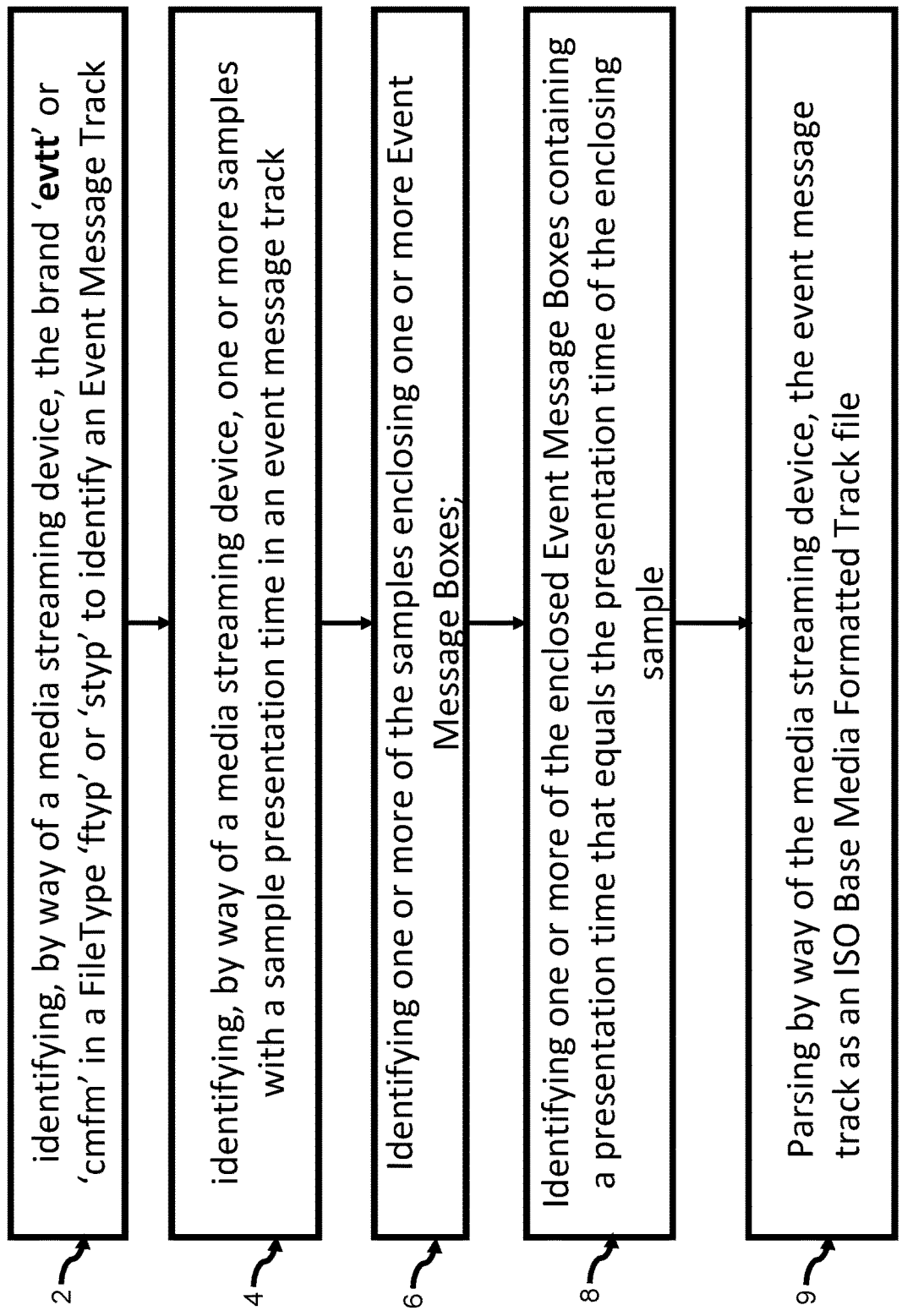
FIG. 1. is a flow chart represent a method for parsing an event message track and identifying event message boxes in an event message track in accordance with the embodiments.

In the case the track is an event message track, as disclosed herein in the flow chart illustrating the method 10 of FIG. 1, the brand 'evtt' or 'cmfm' may be used to signal this in either an FileTyp box or SegmenType Box at step 2. In an ISO Base media file format track file, the File Type Box identified by four characters 'ityp' as designed in ISO Base Media File Format may also be used to signal the brand of the track by 'evtt' or 'cmfm' or another brand to identify that the track is an event message track. In the case movie fragments are used, the indexing and data are partitioned over smaller pieces called movie fragments. The brand is an identifier, typically of four single byte characters to identify the brand of a track or segment. The four single bytes are often referred to as 4 cc code, which could for example be mp4a indicating mpeg 4 audio or mp4v mpeg4 video. For the event message track format disclosed here the 4 cc brands 'cmfm' and 'evtt' are defined. In a progressive ISO Base Media Formatted track file the stbl is used to index samples.

In this case of Movie Fragments, the track run box 'trun' in the traf (track fragment box) is used to index the samples in the Movie Data 'mdat' box. In this case, again samples are continuous and a sample will start after the previous one is finished. The trun box allows signaling the sample duration of each indexed sample, and the composition offset and the sample size, while the track fragment also contains the track fragment earliest decode time in the 'tfdt' track Fragment Base media Decode time box as reflected by step 4 of FIG. 1. By combining these and assuming the samples are stored in decode order, samples can be indexed in Movie Fragment. Nevertheless due to this inherit structure of indexing and the definition of ISO Base media file format, it is not possible to signal samples with zero duration or overlapping samples as this would break both the indexing in ISO Base Media formatted tracks that do use Movie Fragments and ISO Base media file formats that do not use movie fragments; in other words this is not possible in the ISO Base media file format. This makes it difficult to carry overlapping or zero duration or unknown duration content with its own timeline such as event messages that can be instantaneous, of undefined duration or overlapping durations. Signaling this in ISO Base Media File format is necessary. Such event message data often applies to associated media tracks. In case event message box is carried as top level box, this would be the media track enclosing (see step 6 of FIG. 1) the event message box. In case of an event message track that only carries event message boxes as samples, the associated media tracks that the event message applies to would be either all tracks in the media presentation, or specifically chosen associated media tracks.

To overcome this problem, ISO/IEC 23009-1 introduces DashEventMessage box that contains its own timing structures as a top-level box with a presentation time and duration, however in this case it will not be possible to use the features offered by the ISO Base media file format for seeking and indexing. A parser device, is any device such as a file reader, java-script based parser, that can extract the ISO Base Media file Format structures to read them into the computer memory and use them for generating instructions for the processor. Most media streaming devices such as television, i-pod streaming servers, media players, laptops or personal computers running streaming software have a parser device to extract the ISO Base File Formatted structures.

The Common Media Application Track format defined in ISO/IEC 23000-19:2018 specifies the CMAF track format in clause 7, a CMAF Track structure, comprising CMAF addressable media objects such as CMAF tracks, CMAF chunks, CMAF segments. Clause 7 of ISO/IEC 23000-19: 2018 also introduces other concepts for organizing media presentations, such as a CMAF switching sets, selection sets and CMAF media presentations. In this text, we refer to media objects defined in ISO/IEC 23000-19 such as a CMAF fragment as defined in 7.3.2.3, CMAF chunk as defined in 7.3.3.2, CMAF segment defined in 7.3.3.1 and CMAF Track defined in 7.3 all of ISO/IEC 23000-19. A CMAF track structure as defined in ISO/IEC 23000-19:2018 consists of a CMAF Header followed by one or more CMAF fragments. Such a CMAF track structure conforms to the CMAF track format as defined in ISO/IEC 23000-19:2018 clause 7. Such track CMAF fragments are composed of Movie Fragment Box structures and Movie Data structures, as defined in the ISO Base Media File Format ISO/IEC 14496-12 clause 8.8. Moreover, Movie Fragments in a CMAF track are continuous, this implies that the earliest presentation time of a next Movie Fragment equals the presentation time of a prior movie fragment plus the duration of all its enclosed samples as signaled in the track fragment run box (trun) box (see step 8 of FIG. 1). Some additional requirements exist for CMAF track structure apply as documented in 21009-19 clause 7. In some embodiments and referring to FIG. 4, a CMAF header 40 can include data structures that include one or more among ftyp, moov, trak, mdia, hdlr, minf, nmhd, stbl, stsd, urim, and URIBox. The specific structures and substructures for ftyp, moov, moof, mdat, or moof are further illustrated in the data structures 50 of FIG. 5.

Common media application track format (CMAF) uses existing standards such as the ISO Base Media File Format defined in ISO/IEC 14496-12. Throughout this text a presentation time refers to a composition time as defined in ISOBMFF, which in case no composition offset is present is also equal to the decoding time defined by the ISO Base Media File Format, assuming no edit list 'elst' is used, otherwise these edits, that can shift the presentation time also need to be applied. Therefore, it is assumed that any edit list offset have been applied. In case an edit list is present it is assumed to be applied already and the presentation time equals the composition time plus any edits that may have been applied.

However, in many cases no edit list 'elst' will be present and the composition time will equal the presentation time. Further, in case no composition offsets are used in addition to no edit lists the ISO Base Media File Format the sample decode time will equal presentation time. Throughout this disclosure an event message track format is introduced. In a preferred embodiment of the event message track all samples are sync samples and no composition offsets are used. In such a track, assuming no edit list is present, the presentation time, composition time and decode time are all equal. However, this is not always the case and in some specific embodiments the event message track may also use an edit list or composition offset.

An event message track and its specific properties are disclosed in following text. An event message track is a track that is used to carry Event Message Boxes such as the DASHEventMessage box enclosed in samples as defined by the ISO Base Media File Format. It introduces specific structural constraints and procedures to its usage and creation to map the timeline of these DASH Event Message Boxes to a consistent CMAF or ISOBMFF track format structure. In particular the identification and storage of such DASH Event Message Boxes in samples is that samples in an ISO Base Media File Format track or CMAF track structure cannot be overlapping or of zero duration. Mapping the timeline of event message boxes with events of zero duration to a CMAF or ISO Base Media file format track therefore cannot be done without violating the requirements of the ISO Base Media file format that does not allow for overlapping or zero duration samples. Instead we detail carriage of such events without violating the ISO Base media file format track format by specifying explicit relationship between the duration and presentation time defined in the event message box and ISO Base media file format timing constructs such as presentation time, duration and composition time. In CMAF and ISO BMFF track gaps are not allowed, the event message track also discloses how such gaps can be avoided for timespans where no event message is active, by introducing a new box type, namely the event message empty cue box ('embe'). Before further disclosing the event message track format, the next clause details the properties of the DASH Event Message Box, which is a specific instantiation of an Event Message Box in the preferred embodiments herein.

The DASHEventMessageBox is a top-level box included to signal events in tracks and fragments, defined in MPEG DASH ISO/IEC 23009-1. The DASHEventMessageBox is a box structure that typically arises in streaming applications that use MPEG DASH, CMAF or both. The fact is that it is a top-level box, i.e. a box that is not enclosed in another box in ISO Base media file format box structure. Further, it has its own timeline and its timing is independent of the timing used for the sample data in the ISO Base Media File Format, however for CMAF formatted tracks the timescale of the DashEventMessage Box is the same as the track event message box. In addition, the presentation time of the DashEventMessage box always applies to a presentation time in an associated media track or more than one associated media track.

All these aspects make it tricky to work with it DASHEventMessage Boxes as their timing always relates to an associated media presentation time. An associated media presentation time is a presentation time in a media presentation that the event relates to and the presentation time, at which during playback the event should be triggered. DASHEventMessage boxes can occur in ISOBMFF formatted media segments in DASH, and in ISOBMFF tracks such as those based on the Common Media Track Format (CMAF) [2] which supports carrying this Dash Event Message Box as top-level box.

Identification of such events in tracks introduces overhead. For instance, finding out which events are active at any point in the media track requires scanning of a large parts of the entire file, to find the box, as relations between top level DASHEventMessageBoxes are unknown as there is no mechanism in place to relate the different DASHEventMessageBoxes in the ISOBMFF track file today. This is particularly challenging in case fast and real time processing is needed such as for just-in-time packaging where streaming formats for segments are rapidly converted to suit particular device needs.

Another current problem with such Event Message Boxes, is that, when not considering the embodiments herein, it is not defined what happens to the EventMessageBoxes when tracks are de-fragmented, which as per ISOBMFF implies not using MovieFragments in a file that before was using such Movie Fragments. This de-fragmentation cannot happen as times can be signalled relative to the earliest presentation time of the fragment, i.e. the presentation_time_delta is used in the Event Message Box. In this case, in addition, it is not defined where in the stream the boxes should be placed in case a file is de-fragmented and if it is allowed to carry Event Message Boxes in ISO BMFF tracks that do not use movie fragments. This may be especially troublesome in case one wants to use this content in an alternate form such as for archiving, or one wants to separate the Event Message Box data from the media data. Such identification and storage of event messages is an important method to be carried out in different steps by a media streaming device. In the current state of the art, it is not defined where the Event Message Boxes should go to in case a progressive track format was used to store and transmit event messages. In addition, Event Message Boxes cannot be de-multiplexed from CMAF track files and stored independently in the current state of the art. De-multiplexing is useful when metadata and media data need to be separated for re-use in other scenarios or applications. As the Event message box is carried between interleaved Fragments it is multiplexed with the audio-visual track containing the Event Message Boxes. However, multiplexing and demultiplexing in the ISO Base media file format are not defined for such top-level box structure, and hence the event message track is disclosed for the event message de-multiplex and multiplex algorithms are disclosed herein. The event message track introduced herein overcomes each of these shortcomings in the state of the art by enabling more efficient indexing of event message boxes, i.e. by storage in an event message tack format using ISO Base media file format timed metadata track. By introducing an ordering when storing event message boxes in samples that relates the ISO Base Media File Format timeline to the timelines of the event message boxes, efficient storage and access is guaranteed using ISO Base Media File format constructs.

In a preferred embodiment, a media streaming device, is parsing CMAF tracks or other ISO Base Media File format tracks, receiving them and identifying Event Message Boxes inside the tracks, i.e. as top-level boxes enclosed in the track. Referring to an exemplary file format 30 in FIG. 3, a CMAF track file or fragmented mp4 file includes the one or more of the following top level event message boxes ftyp 32, moov 33, emsg 34, moof 35, mdat 36, emsg 37, moof 38 or mdat 39. For this technical description a media streaming device can be any device dealing with streaming media either actively or passively. They could be origin servers or packagers that are used for formatting live encoded media, or alternatively embedded in devices such as smart phone, television, ipad, television or other consumer electronics receiving the track for rendering the media presentation, TV Channel or any other associated media tracks. What characterizes the media streaming device is its ability to parse and process ISO Base media file format tracks, that may also include Movie Fragments. This parsing (see step 9 of FIG. 1) may happen by using one or more embedded parser devices that can identify and detect the boxes as defined in the ISO Base Media File Format. Media streaming devices are processing the media streams to identify the content and metadata enclosed inside the stream. In some embodiments the media streaming device could also be a live encoder that is embedding the timed metadata relating to the associated media tracks comprising the media broadcast. In addition, the media streaming device may store or transmit the resulting track format after its methods for identifying and processing event messages have been completed. The method includes both a method for identifying event messages in a track file as top level boxes and storing or transmitting them in an event message track. Another method is introduced to identify event message boxes in an event message track and multiplex them into a CMAF track file for transmission.

To summarize, the most important aspects that identify a media streaming device are the following: A media streaming device is used to receive one or more media tracks or segments or transmit one or more media tracks or segments, the segments or tracks being a DASH segment or CMAF track or an HTTP Live Streaming (HLS) presentation or any other media presentation comprised of tracks in the ISO Base media file format. A media streaming device may be used to store the one or more tracks after some processing and insert Event Message Boxes in a separate track conforming to the event message track structure. Alternatively, the streaming device may be only used to receive and parse the media presentation, wherein the timed metadata and events are passed up to the application. Alternatively, in some embodiments the media streaming device will use the event message track to multiplex top level event message boxes into the media tracks that it is transmitting or receiving, using the event message track multiplexing algorithm disclosed in this document. In some embodiments the media streaming device may also perform a fragmentation or de-fragmentation of the event message track in a track with or without movie fragments, and also store or transmit the event message track in fragmented or de-fragmented form.

Figure 2:
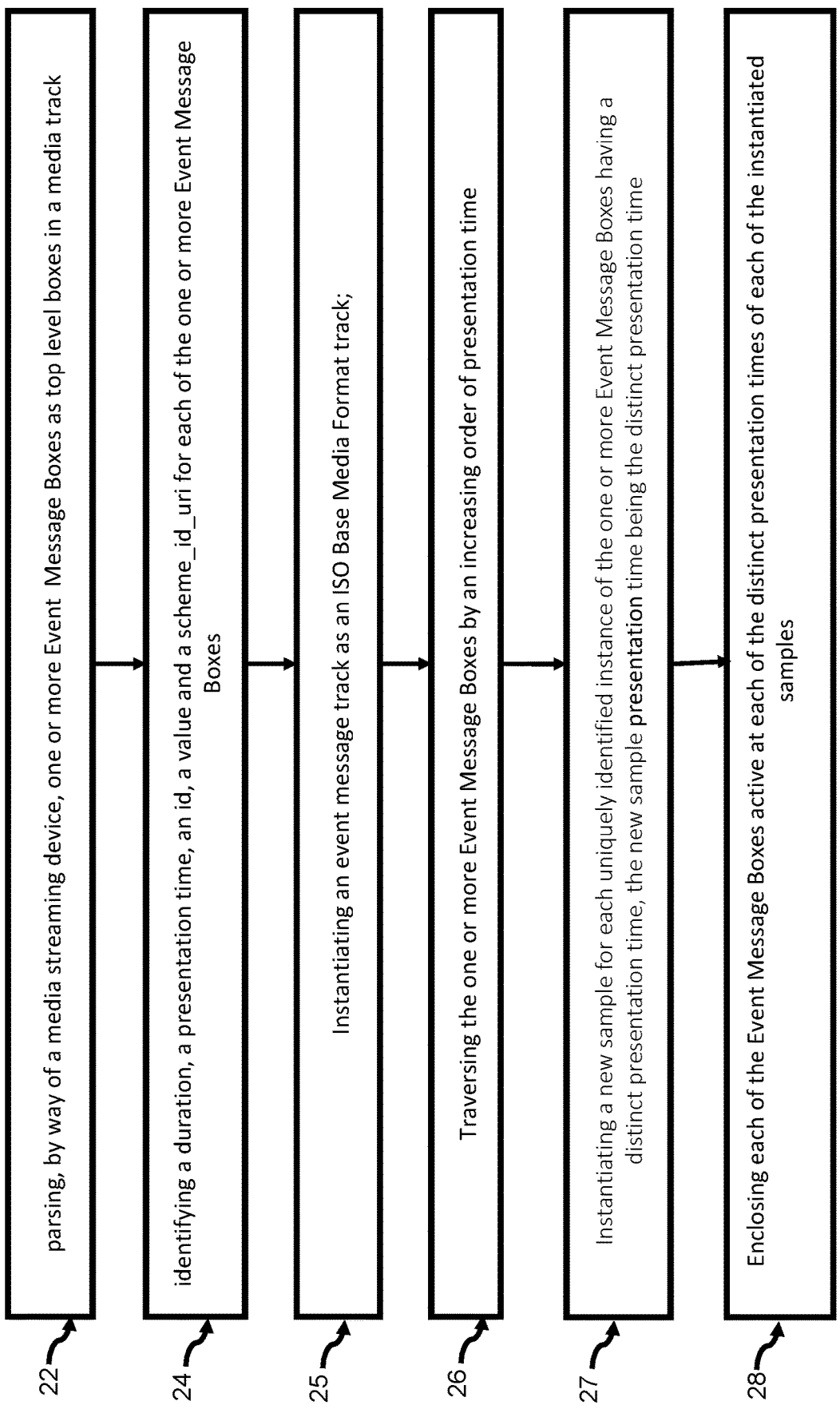
FIG. 2. is a flow chart representing a method for parsing top level event message boxes and converting them to store them in an event message track format in accordance with the embodiments.

In the preceding and rest of this technical description and all following text Dash Event Message Boxes are considered an exemplary instantiation of Event Message Boxes. Each time Event Message Box is referred, the Event Message Box can be replaced by DASHEventMessageBox or another type of Event Message Box that could be defined. In this technical description and all following text and claims Event Message Boxes may be DASHEventMessageBoxes as defined in MPEG DASH ISO 23009-1 clause 5.10.3.3. Alternatively an Event Message Box can be any other memory laid out structure that conforms to the box structure as defined in ISO based media file format that comprises at least five or more of the following entries which can be parsed by a media streaming device from one or more Event message boxes as top level boxes in a media track (as shown in step 22 of method 20 of FIG. 2): presentation_time or presentation_time_delta, duration, id (which is short for identifier), scheme_id_uri, value, message data (see step 24 of FIG. 2). The method in this technical specification can be applied to any Event Message Box to be carried using ISO Base Media File Format (see step 25) as top level box, using the box structure syntax defined in the ISO Base media file format. In addition, this specification introduces an alternative method for identification and storing or transmitting Event Message Box structures in ISOBMFF tracks as samples, in an event message track. The conversions are achieved, by using methods disclosed herein, which then as a consequence enables consistent de-fragmentation and de-multiplexing of tracks carrying event message boxes. Further, carriage of DASHEventMessageBox in ISOBMFF will make this information more easily accessible to media streaming devices that have a software or hardware stack for processing ISO Base Media File Format samples. This allows these media streaming devices to efficiently seek through ISOBMFF formatted media files or extract data from the stream quickly in order to prepare content for storage or transmission. This is beneficial for media streaming devices that need fast processing of event data such as on-the-fly packagers and other devices like low latency media streaming clients. More particularly, in some embodiments as illustrated in FIG. 2, the method 20 can further include the step 26 of traversing one or more Event Message Boxes by an increasing order of the presentation time and instantiating at step 27 a new sample for each uniquely identified instance of the one or more Event Message Boxes having a distinct presentation time, the new sample presentation time being the distinct presentation time. The method 20 can further include the step 28 of enclosing each of the Event Message Boxes active at each of the distinct presentation times of each of the instantiated samples.

In CMAF Track files DASHEventMessageBoxes may occur as top-level boxes as defined in ISO/IEC 23009-1[1]. The current embodiment discloses a method for identifying DASHEventMessageBoxes as a box structure based on existing ISO Base Media File Format [3] and a format for storing and transmitting these DASHEventMessageBoxes.

The DASHEventMessageBox arises in two forms defined in ISO/IEC 23009-1:

```
aligned(8) class DASHEventMessageBox extends FullBox('emsg',
version, flags = 0){
    if (version==0) {
        string                scheme_id_uri;
        string                value;
        unsigned int(32)      timescale;
        unsigned int(32)      presentation_time_delta;
        unsigned int(32)      event_duration;
        unsigned int(32)      id;
    } else if (version==1) {
        unsigned int(32)      timescale;
        unsigned int(64)      presentation_time;
        unsigned int(32)      event_duration;
        unsigned int(32)      id;
        string                scheme_id_uri;
        string                value;
    }
    unsigned int(8) message_data[];
}
```

The semantics as per ISO/23009-1 clause 5.10.3.3.4 are as follows:

scheme_id_uri: is a null-terminated ('C') string in UTF-8 characters that identifies the message scheme. The semantics and syntax of the message_data[ ] are defined by the owner of the scheme identified. The string may use Uniform Resource Name (URN) or Uniform Resource Locator (URL) syntax. When a URL is used, it is recommended to also contain a month-date in the form mmyyyy; the assignment of the URL must have been authorized by the owner of the domain name in that URL on or very close to that date. A URL may resolve to an Internet location, and a location that does resolve may store a specification of the message scheme.

value: is a null-terminated ('C') string in UTF-8 characters that specifies the value for the event. The value space and semantics must be defined by the owners of the scheme identified in the scheme_id_uri field.

timescale provides the timescale, in ticks per second, for the time delta and duration fields within version 0 of this box;

presentation_time_delta provides the Media Presentation time delta of the media presentation time of the event and the earliest presentation time in this segment. If the segment index is present, then the earliest presentation time is determined by the field earliest_presentation_time of the first ' sidx' box. If the segment index is not present, the earliest presentation time is determined as the earliest presentation time of any access unit in the media segment. The timescale is provided in the timescale field presentation_time provides the Media Presentation time of the event measured on the Movie timeline, in the timescale provided in the timescale field.

event duration provides the duration of event in media presentation time. In version 0-, the timescale is indicated in the timescale field; in version 1, the timescale of the MovieHeaderBox is used. The value 0xFFFFFFFF indicates an unknown duration.

id: a field identifying this instance of the message. Messages with equivalent semantics shall have the same value, i.e. processing of any one event message box with the same id is sufficient.

message_data: body of the message, which fills the remainder of the message box. This may be empty depending on the above information. The syntax and semantics of this field must be defined by the owner of the scheme identified in the scheme_id_uri field.

The Box definition is exemplary for the definition of any ISOBMFF box definition with at least four or more of the fields from presentation_time, event_duration, id (which is short for identifier), scheme_id_uri, message_data and value could qualify as an Event Message Box. In such Event Message Boxes the semantic meaning will be closely related or similar to the DASHEventMessageBox. Any text in this description referring to Event Message Box applies to the DASHEventMessageBox or any other similar instantiations. Thus, the embodiments herein not only apply to DASHEventMessageBoxes and other event messages, but could be carried and identified and processed as well by the disclosed methods. This means that for any Event Message Box that is closely related the event duration field, may be referred to as a field to signal having a duration of the event based on a timescale in ticks per second (which is either the timescale of the media track signaled in the media header or in the Event Message Box itself). The presentation time is a time that corresponds to the presentation time in the media timeline of an associated media tracks at which the event will be applied. The id or identification field in the Event Message Box is used to identify the instance of a message, by its uniqueness per instance, duplicate Event Message Boxes for instance can be detected using the id field in combination with scheme_id_uri and the value fields. In other words, any processor or media streaming device could identify duplicate event messages by inspecting the value, scheme_id_uri and id fields. In addition, the message_data field is sometimes called data or payload field, it contains the bytes of the data of the message based on the scheme signaled in the scheme_id_uri field. The exact semantics of the data carried in the message_data is defined by the scheme signaled in scheme_id_uri.

The scheme_id_uri field in an Event Message Box identifies the type of the metadata in that box. The value will also present in different instances of the Event Message Box such as the DASHEventMessageBox, and can be used to signal particular subschemes or indicate particular usage for a scheme type as identified by scheme_id_uri, the scheme signaled applies to the data type carried in the message_data or payload field.

The following text provides the details on the event message track format. The DashEventMessageBoxes shall be carried in ISOBMFF timed metadata tracks as defined in ISOBMFF clause 12.3. In preferred embodiments the event message track uses the 'meta' media handler type, and the associated media header ('nmhd'). In the event message track DashEventMessageBox structures are carried in samples as defined by the ISO Base Media File Format, which means carriage in the MovieData box (mdat) as samples. In preferred embodiments the tracks shall use the URIMetaSampleEntry ('urim') as the sample entry stsd and a URIBox must occur in that box, carrying the exact urn scheme: urn:mpeg:dash:event:2019

However, an alternative scheme urn may be used to signal carriage of Event Message Boxes in some embodiments as long as the urn makes it clear that Event Message Boxes are carried in the track format.

A different scheme_id_uri may be used inside the different Event Message Boxes to identify the scheme of content in the message_data or payload field. In addition, when using this method, the different scheme_id_uri to be signalled in the manifest may be signalled in kind boxes in the ISOBMFF track using a schemeIdUri field urn:mpeg:dash:event:2019 and the value field of the kind box may be used to signal the sub-schemes signalled in the DashEventMessageBoxes in the samples. Tracks may contain multiple kind boxes to signal all different schemes signalled in the track.

Each ISOBMFF sample in the event message track may contain one or more Event Message Boxes. Samples may contain a single Event Message Box EmptyCue (embe), in this case, the sample contains no DashEventMessageBox structures, and no events are active during the sample presentation time. The empty cue box is defined as follows:

```
aligned(8) class EventMessageBoxEmptyCue extends
    Box('embe')
{
}
```

The empty cue box or EventMessageBoxEmptyCue, is a box structure defined for usage in the ISO Base media file format. The empty cue box or EventMessageBoxEmptyCue is defined to signal durations in the metadata track when no event is active, with the following semantics. The box is empty, the duration and presentation time are defined by the sample that carries the box structure. The usage of an Event Message Box or empty cue box enables avoiding empty samples to signal when no event metadata or event is active. Empty samples in ISO Base Media file format are allowed in ISOBMFF but not in the event message track as it may cause problems in some media streaming devices. For example, the divide by zero exception may occur in some implementations resulting in a number overflow resulting in a crash. The samples in the event message track follow all constraints for timed metadata track as defined in ISOBMFF clause 12.3. For identifying events in an event track the following the general time processing in ISOBMFF tracks for media streaming devices is defined. Each Event Message Box in a sample shall be passed at the time from the time-to-sample table, as mapped by the edit list (if any), or by the time the top-level Event Message Box is parsed, in case of a top-level Event Message Box as per ISO/IEC 23009-1. The application may then process the event message box based on the client and metadata processing procedures, such as dispatching the events immediately to an application of delaying this dispatch and only dispatch once the event is about to be triggered. Some media streaming devices may run an application on top of the media streaming capabilities, this application may be user facing and run on any type of hardware or software.

The following text defines the exact format for transmitting or storing Event MessageBoxes identified in the stream. This format is mandatory when conforming to an event message track and are important for identification and storage or transmission of event messages, and it is mandatory for efficient and rapid access of samples as needed by many streaming devices.

Any sample with a presentation time and duration, as defined in ISO Base Media file format and this text, must contain all Event Message Boxes active in the timespan from the presentation time up to but not including presentation time plus duration. An Event message box is active from the sample presentation time in the associated media tracks, or in the current presentation up to its defined duration based on the timescale of the track of the enclosing or associated media tracks. Event Message Boxes should be identified by a media streaming device before they need to be triggered. Further each sample only contains active event message boxes and no event becomes active during a sample after the sample presentation time. This means that each Event Message Box carried has a presentation time equal or smaller than the presentation time of the sample that carries the payload. In addition, the duration of samples is defined by the event duration field in the Event Message Box. In case the Event Message Box was not carried in an earlier sample, the duration of the sample and the duration signaled in the Event Message Box should correspond, i.e. they should be the same. An exception would be in case of overlapping event in a next sample, in that case the sample duration is smaller than the duration signaled in the Event Message Box and the duration is the difference between the current sample presentation time and the presentation time of the next event message box carried in the track.

Samples shall only contain Event message boxes that start at or are already active on the respective ISOBMFF sample presentation time. This implies that an ISOBMFF sample may carry an Event Message Box that was active in an earlier sample, but an Event Message Box shall not have a presentation time in the middle or during a sample duration. Also, Event Message Boxes should not end and cease to be active in the middle or during a sample. However, this can happen in case multiple overlapping event message boxes are carried in a single ISOBMFF sample. By organizing the storage and transmission of Event Message Boxes in ISO Base media file format this way, seeking remains a trivial task as all Event Message Boxes are active at the sample presentation time are enclosed in the sample. DashEventMessageBoxes with a duration extending multiple samples, must be carried in each of these samples. This means that event message boxes active at a certain time can be identified by seeking into the ISO BMFF track, i.e. the event message track. In cases metadata is overlapping, Event Message Boxes are copied through in following samples that are instantiated when a new event begins. Event messages introduced at a later time always introduce a new sample, and event messages that are still active will be embedded in these new samples as well.

The duplicate carriage of Event Message Box in different samples avoids dependencies between samples and enables seeking in tracks based on a single sample. Duplicate Event Message Boxes have the same scheme_id_uri, id and value fields, and such duplicates can therefore be detected easily and ignored if they have already been processed or detected by the receiver, i.e. the media streaming device, before. Duplicate carriage cases should not only occur in the case Event Message Boxes are overlapping in the track. If this is not the case, duplicate carriage of Event Message Boxes shall be avoided.

There are internal timing values in an Event Message Box, namely the presentation_time, timescale, presentation_time_delta and the duration. In a preferred embodiment of the event message track the timing structures occur in the following way.

1. The EventMessageBox timescale, if present, shall match the timescale defined in the MovieHeaderBox, in case of differing timescales, conversion of the Event Message Box must be applied.

2. In case a DashEventMessageBox is version 0 or contains relative timing using presentation_time_delta, it must be converted to a version 1 box. This can be done by computing the presentation time by adding the earliest presentation time of the subsequent fragment and the presentation_time_delta. The converted DASH Event Message Box version 1 can be carried in the event message track. Event message boxes with relative timing such as event message box version 0 relate timing to the earliest presentation time of the following movie fragment earliest presentation time. However, top level Event Message Boxes are only used in fragmented tracks where this information is available. Therefore this conversion must be applied when de-fragmenting the track and storing or transmitting event message boxes in the event message track.

3. If the sample is the first sample containing one or more specific instances of an Event Message Box, the sample presentation time must equal the Event Message Box presentation_time for each of these specific instances 4. In case there is no subsequent Event Message Box to be carried when all Event Message Box structure cease to be active, the ISOBMFF sample duration MUST equal the largest Event Message Box duration enclosed in the sample, given that this duration is not zero or unknown, and that the event was not active in a prior sample. In that case the duration MUST be the duration from the beginning of the sample until the time when all the events cease to be active. The next sample MAY contain an EventMessage BoxEmptyCue (empty event cue box, 'embe') to signal a timespan in the track at which no event is active.

5. In case there are one or more subsequent Event Message Boxes to be carried before the largest known Event Message Box duration is over, the sample duration shall equal the difference between the presentation_time of the current sample and first subsequent Event Message Box carried in a subsequent sample, that was not active in the prior sample.

6. If the Event Message Box duration is zero or unknown, the sample duration shall equal the difference between the presentation_time of the current sample and a subsequent new instance of the Event Message Box carried in a next sample. In case there is no next sample, the duration may be set to an arbitrary value or zero and updated once it becomes available.

7. If the sample is not the first sample containing one or more specific instances of an Event Message Box, the sample presentation time and the Event MessageBox presentation_time of these specific instances are different. This occurs when an Event Message Box carried in a prior sample is still active in a subsequent sample that introduced new other Event Message Box instances. This follows from prior clauses and happens in case of overlapping events.

8. One or more samples carrying MessageBoxEmptyCue shall be used to cover timespans where no event is active in samples.

9. Event Message track may contain all subschemes signalled in scheme_id_uri in respective kind boxes and may contain a nmhd (null media header box) in the Movie Box, and the handler box may be set to 'meta'

The semantics of the Event Message Box shall be used when processing or dispatching the samples, as per ISO/23009-1 clause 5.10.3.3.4 or any other semantics for an Event Message Box defined. Briefly summarized they are as follows:
  a) i.e. scheme_id_uri signals the scheme of the message,
  b) id and value can be used to detect duplicate messages and signal sub-schemes
  c) presentation_time signals presentation time of event (should be equal to presentation time of sample, or smaller in case the event was already active in a previous sample)
  d) timescale signals timescale of the event, shall be equal to the timescale of the ISOBMFF track
  e) event duration signals the actual duration of the event (may be longer than sample duration), and may also signal indefinite duration f) message data contains the binary payload of the message Samples can be acquired and dispatched to an application as defined by processing models for such Events.

The following general processing is considered in case an Event Message Box is identified in a track file or sequence of segments. First, de-multiplexing a CMAF track or DASH segment with top level DashEvent Message Boxes to an event message track. Clause A. This is referred to as the event message de-multiplex algorithm. Second, multiplexing an event message track with a CMAF media track file as top level boxes is defined as the event message track multiplexing algorithm. Last, additional new sample duplication for fragmentation of the event message track is defined.

The following steps convert a CMAF Track file with top level DashEventMessageBoxes (e.g. a CMAF file based on ISO/IEC 23000-19:2018) to a separate event message track. This processing is the event message de-multiplex algorithm. The following text describes the event message samples. The resulting track format is transmitted or stored by the media streaming device in some exemplary embodiments.

NOTE: Timescale of Event Message Box in a CMAF track file is equal to the timescale defined in the MediaHeaderBox.

NOTE: For the case where events do not overlap or have zero/indefinite duration the processing model and track format will be simplified.

NOTE: There are no strict rules for order of Event Message Box in a CMAF track file, this is why the entire track file is scanned first in this processing model.

Table 1 below identifies the steps for de-multiplex operation of top level Event Message Boxes.

Figure 6:
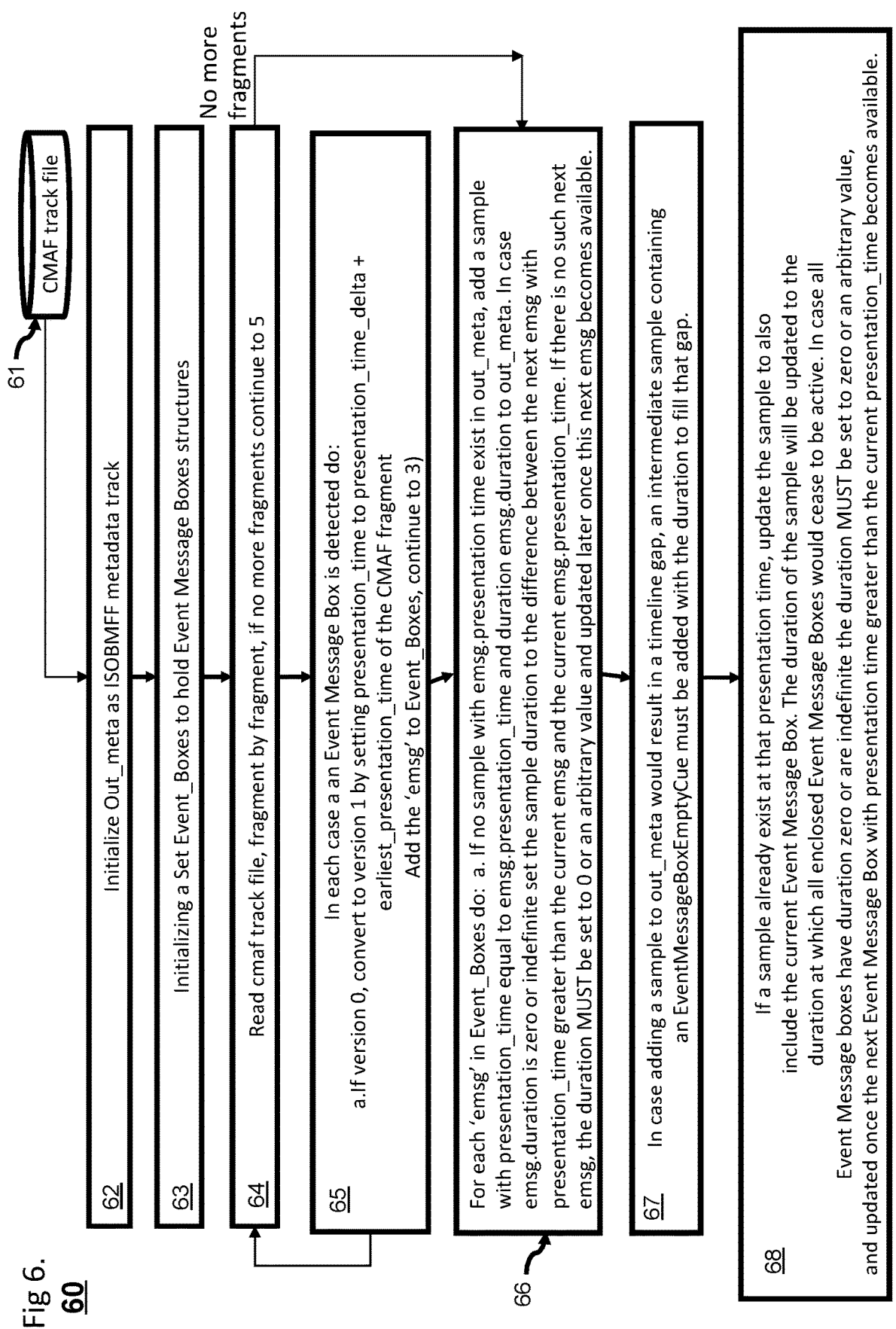
FIG. 6. is a flow chart representing the Event Message demultiplex algorithm which can be used to demultiplex top level event message boxes to an event message track where the algorithm can be used to extract event message boxes from a CMAF track file or DASH segments and carry them in an event message track.

The text following Table 1 provides more details of technical description. Table 1 details the algorithmic summary when using DashEventMessageBoxes as further represented by a flow chart in FIG. 6 illustrating a method 60.

TABLE 1 event message de-multiplex algorithm
Input (CMAF Track File (61) in_cmaf) Output (track out_meta)

1. Initialize out_meta as an ISOBMFF metadata track at step 62 with constraints defined for the event message track, the MovieHeaderBox is set to the timescale defined in the MediaHeaderBox of the source CMAF Track file, the sampleEntry is URIMetaSampleEntry, the URIBox contains urn: mpeg: dash: event: 2019 or another urn to signal presence of event message boxes
2. Initialize a Set Event_Boxes at step 63 to hold Event Message Boxes structures
3. Read in_cmaf at step 64, fragment by fragment, if no more fragments continue to 5
4. In each case a an Event Message Box is detected do at step 65:
   a. If version 0, convert to version 1 by setting presentation_time to presentation_time_delta + earliest_presentation_time of the CMAF fragment
   Add the 'emsg' to Event Boxes, continue to 3)
5. Sort Event_Boxes by increasing presentation_time
6. For each 'emsg' in Event_Boxes at step 66 do:
   a. If no sample with emsg.presentation time exist in out_meta, add a sample with presentation_time equal to emsg.presentation_time and duration emsg.duration to out_meta. In case emsg.duration is zero or indefinite set the sample duration to the difference between the next emsg with presentation_time greater than the current emsg and the current emsg.presentation_time. If there is no such next emsg, the duration MUST be set to 0 or an arbitrary value and updated later once this next emsg becomes available.
   In case the presentation_time of the new sample would overlap a prior sample in out_meta, update the prior sample duration to the difference of the presentation time of the Event Message Box and the presentation time of that prior sample and include any one or more Event Message Box from the prior sample that are still active in the added sample.
   At step 67, in case adding a sample to out_meta would result in a timeline gap, as the presentation_time of the added sample would be greater than the presentation time of the prior sample plus its duration, an intermediate sample containing a EventMessageBoxEmptyCue must be added with the duration to fill that gap.
   b. At step 68, if a sample already exists at that presentation time, update the sample to also include the current Event Message Box. The duration of the sample will be updated to the duration at which all enclosed Event Message Boxes would cease to be active. In case all Event Message boxes have duration zero or are indefinite the duration MUST be set to zero or an arbitrary value, and updated once the next Event Message Box with presentation time greater than the current presentation_time becomes available.

de-multiplex algorithm. This processing model results in event message tracks carrying Event Message Boxes as sample data, in a track file conforming to an event message track. In addition, the kind box may be used to signal each of the schemes used in Event Message Boxes enclosed in the track. This track format is useful for efficient processing of Event Message Boxes later on when they are carried in The following text explains the process detailed in Table 1 with more details to understand the essential steps involved.

The event message de-multiplex algorithm comprises the following steps.

The media streaming device receives a track input file that is a CMAF track file or a sequence of DASH segments. In a next step an output ISOBMFF metadata track with constraints of the event message track will be instantiated, an ISOBMFF timed metadata track as defined in ISOBMFF section 12.3, referred to as out meta, that is an ISOBMFF track file with the MovieHeaderBox set to the timescale defined in the MediaHeaderBox of the source CMAF Track file, the sampleEntry (stsd) is URMetaSampleEntry, and the URIBox enclosed in the URMetaSampleEntry contains urn:mpeg:dash:event:2019 or any other urn scheme identifying the carriage of Event Message Boxes. In a next step, a set of Event Message boxes Event Boxes is instantiated to store all Event Message Boxes identified in the CMAF track file or sequence DASH segments in the first step. Subsequently, the sequence of DASH segments or CMAF track files is read fragment by fragment by the media streaming device, where a fragment being a combination of a Movie Fragment Box and Media Data box moof mdat, and optional segmentType, prft and Event Message Boxes. In each case an Event Message Box or Event Message box is detected it will be added to the set of event message boxes event boxes, however in case the Event Message Box is of type 0 and contains relative timing information using presentation_time_delta relative to the MovieFragmentBox, the box is converted to a type 1 box with timing relative to the anchor of the track or DASH period before it is added. This is performed by adding the presentation_time_delta to the earliest presentation time of the fragment and changing the presentation_time_delta field to a presentation_time field and changing the box version to 1. In case timescale of the Event Message Box is different this will also be converted before it is added to the Set.

When all Event Message Boxes and fragments are read, the processing begins. First the set Event Boxes are sorted with increasing presentation time of the Event Message Boxes. For each Event Message Box in Event_Boxes do the following:

If no sample with Event Message presentation time exist in out_meta, add a sample with presentation_time equal to the Event Message presentation_time and duration Event Message duration to out_meta. In case Event Message duration is zero or indefinite, the method sets the sample duration to the difference between the next Event Message Box with presentation_time greater than the current Event Message Box and the current Event Message Box presentation_time. If there is no such next Event Message Box, the duration will be set to 0 or an arbitrary value and updated later once this next Event Message Box becomes available.

In case the presentation_time of the new sample would overlap a prior sample in out_meta, update the prior sample duration to the difference of the presentation time of the Event Message Box and the presentation time of that prior sample and include any one or more Event Message Boxes from the prior samples that are still active in the added next sample.

In case adding a sample to out meta would result in a timeline gap, as the presentation_time of the added sample would be greater than the presentation time of the prior sample plus its duration, an intermediate sample containing a DashEventMessageBoxEmptyCue may be added with the duration to fill that gap.

This step may also be performed at the end in order to fill any still existing timeline gaps.

If a sample already exist at that presentation time in out meta, update the sample to also include this current Event Message Box by enclosing it in the sample. The duration of the sample will be updated to the duration at which all enclosed 'emsg' events would cease to be active. In case all event message boxes have duration zero or are indefinite the duration MUST be set to zero, and updated once the next emsg with presentation time greater than the current presentation_time becomes available. When this happens the duration will be set to the difference of the new event message box presentation time and that sample. Following Event Message Boxes with a presentation time greater than the last presentation time may be added to out meta. In such cases the sample durations will always be updated such that none of the sample in the ISO Base Media File format track are non-overlapping.

By applying these sequence of steps, not strictly in this order, but comprising at least the steps of identifying the top level event message boxes, creating corresponding samples, enclosing all Event Message Boxes currently active during a sample duration in that sample and enclosing empty event cue boxes to fill timeline gaps an event message track is created. The steps could include removing the top level, Event Message Boxes from the segments or track files, achieving a de-multiplexed media source without event message boxes interleaved.

The next clause introduces processing of event message tracks and CMAF tracks and/or DASH segments in order to insert top level event message boxes.

CMAF tracks may contain one or more Event Message Boxes. In a live stream these may contain signalling relevant for the broadcast. This clause describes the processing of inserting Dash Event Message Box in a CMAF track using an event message track. The announce time is the time a Event Message Box should be included before it is applied.

In this case it is assumed that both a CMAF Track file and the event message track have a common timeline (time line origin), as the events would otherwise not be inserted at the correct time. The announce time is given as an approximate time at which the event message box should appear in the track file before the associated presentation time of a sample in the media segments or CMAF tracks. In case the announce time is 5 seconds, the stream will be formatted such that the Event Message box appears in the stream approximately 5 seconds before the associated media presentation plays and the event would be triggered.

Figure 7:
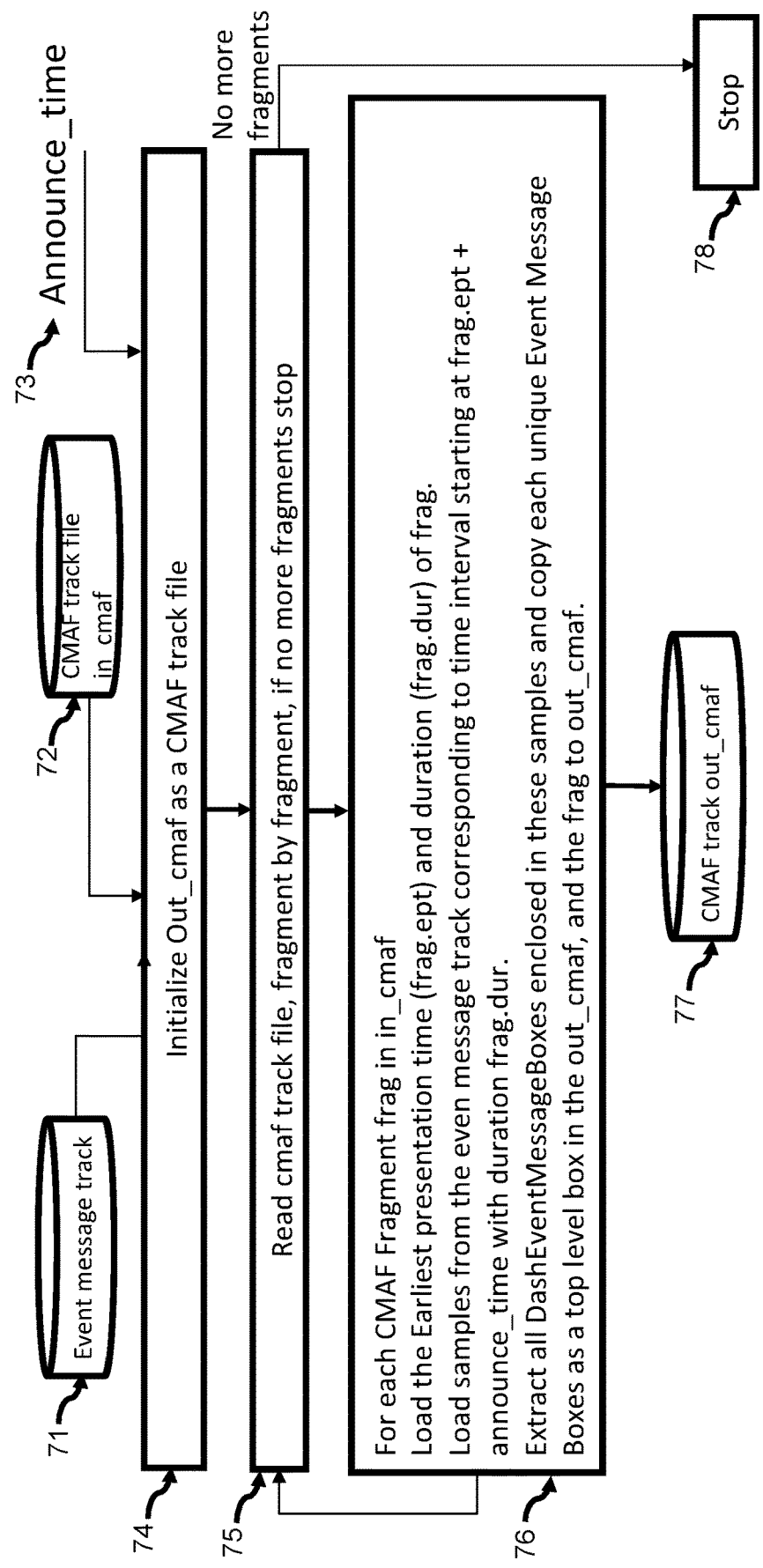
FIG. 7. is a flow chart representing a Event message multiplex algorithm which can be used to multiplex an event message track into a cmaf track file as top level boxes in accordance with the embodiments.

FIG. 7. is a flow chart representing a Event message multiplex algorithm 70 which can be used to multiplex an event message track into a cmaf track file as top level boxes in accordance with the embodiments:

TABLE 2 event message multiplex algorithm:

Input (CMAF Track File in_cmaf, Event message track in_meta, announce time )
Output (CMAF Track file out_cmaf)
Initialize out_cmaf at step 74 and read cmaf track file, fragment by fragment at step 75
(and if no more fragments stop at step 78)

TABLE 2-continued event message multiplex algorithm:

At step 76, for each CMAF Fragment frag in in_cmaf
Load the Earliest presentation time (frag.ept) and duration (frag.dur) of frag.
Load samples from the in_meta corresponding to time interval starting at frag.ept +
announce_time with duration frag.dur. Extract all DashEventMessageBoxes enclosed in
these samples and copy each unique DashEventMessageBox as a top level box in the
out_cmaf, copy the frag to out_cmaf (77) .

NOTE:
This processing model may lead to more identical DashEventMessageBoxes being inserted in front of different fragments. For example, see identical emsg carried in different fragments in a track file 80 as shown in FIG. 8. This is suitable in live applications and helps clients that just tune in to receive the active events immediately. Duplicate DashEventMessageBoxes can be detected as being duplicate based on the value, id and schemeIdUri.

The following text describes the event message multiplex algorithm as disclosed in this invention with more detail. The media streaming device opens the out cmaf file that already contains movie fragments carrying the media samples. The media streaming device loads the track fragment by fragment. For each fragment an earliest presentation time and a fragment duration is computed (by summing the duration of each of the samples in the MovieData box following the fragment). Alternatively, this operation could be applied using CMAF chunks. The respective samples with time shift applied by announce time are used to load the respective sample. All event message boxes are extracted from the samples in the event message track corresponding to that timespan, and they are inserted as top level box in out cmaf before the fragment.

Another processing of the event message track is defined for fragmentation and de-fragmentation of the event message tracks.

In a preferred embodiment of an event message track all samples are sync samples, tracks carrying EventMessageBoxes as samples can be fragmented in case desirable (this may be useful for some delivery schemes or protocols or to deliver the track piece by piece). In case samples with long durations exist where no metadata is defined, signalled by EventMessageBoxEmptyCue or Event Message Box with long duration, these may be signalled using multiple empty cues carried in different samples. In addition, samples carrying Event Message Boxes or event message box empty cue may be broken into two samples carrying the same payload as to facilitate fragmentation to a desired fragment duration. Fragmented tracks can also be de-fragmented. In both cases the event message track format shall not contain gaps.

Some advantages beyond the state of the art of using event message tracks include the following: carriage in ISOBMFF compliant tracks of event message boxes, processing for multiplexing and de-multiplexing to DASH segments and CMAF tracks. A processing mode for fragmentation suiting protocols for delivering event messages as fragments with arbitrary or fixed length.

In addition, this event message track format can be used to implement advanced metadata track for carriage of overlapping, zero duration, duplicate metadata with different schemeIdUri using Event Message Boxes. This may be used for different use cases such as targeted advertisement events, where each presentation includes its own metadata track with targeted information. User tracking events as side information for monitoring and quantifying viewer impressions or program information and splicing. In exemplary embodiments, the presentation_time and duration of the event message correspond to an ad break of one or more associated media tracks. The presentation time (CUE-OUT), in this case will be an IDR frame or a key frame in the one or more associated media tracks, and so would be the frame at presentation time plus duration (CUE-IN). These splice events carried as Media Presentation Description (MPD) event in the manifest signalling the presentation time and duration. In addition the message data payload may contain additional information about the splice point. A common splice point message could be a SCTE-35 marker with a splice information table carrying a splice insert command. In a DASH manifest these MPD events may be created according to the specification SCTE 214-1. Such splicing information in a CUE may occur at the presentation time of the event, while the corresponding DUE-OUT to return to the original content may happen at presentation_time plus the duration of the event. A streaming media device acting as a splicer may use this information to segment and splice the media inserting different content in that timeslot such as an inserted ad. What is important is that the presentation_time and the presentation_time plus duration corresponds to intra decoder refresh or key frames in the associated media tracks.

In some other embodiments, the event messages carry viewing impression, such as based on IAB VAST viewer-impression element. Such elements could be carried in the payload of MPD event or event messages, and the presentation time can be triggered by a media streaming device or any client to perform an action, such as requesting a URI link to log viewing of the associated media tracks in the streaming media presentation. The Extensible Markup Language (xml) code below shows a piece of XML representing a VAST viewer impression that could be embedded in the event message as message data or in the mpd event.

```
ViewableImpression id="1543">
  <Viewable>
    <![CDATA[http://search.iabtechlab.com/error?errcode=102&imprid=s5-ea2f7f2>
  </Viewable>
</ViewableImpression>
```

Various embodiments of the present disclosure can be implemented on an information processing system. The information processing system is capable of implementing and/or performing any of the functionality set forth above.

Any suitably configured processing system can be used as the information processing system in embodiments of the present disclosure. The information processing system is operational with numerous other general purpose or special purpose computing system environments, networks, or configurations. Examples of well-known computing systems, environments, and/or configurations that may be suitable for use with the information processing system include, but are not limited to, personal computer systems, server computer systems, thin clients, hand-held or laptop devices, notebook computing devices, multiprocessor systems, mobile devices, microprocessor-based systems, set top boxes, programmable consumer electronics, network PCs, minicomputer systems, mainframe computer systems, Internet-enabled television, and distributed cloud computing environments that include any of the above systems or devices, and the like. The information processing systems contemplated herein include media streaming devices such as smart televisions, tablet computers, personal computers, media streaming servers, content delivery networks or other components with similar functionality for transmitting, receiving and processing of media streaming content. The media streaming device can also include a parser device which can include a device such as a file reader, java-script based parser, that can extract the ISO Base Media file Format structures to read them into the computer memory and use them for generating instructions for the processor. Again, a media streaming device as contemplated in various embodiments herein can be any device dealing with streaming media either actively or passively. They could be origin servers or packagers that are used for formatting live encoded media, or alternatively embedded in devices such as smart phones, televisions, ipads, or other consumer electronics receiving the track for rendering the media presentation, TV Channel or any other associated media tracks. As noted previously, the data processing can be any number of data processing techniques suited for the identifying, enclosing, storing, transmitting, receiving, formatting, converting, multiplexing, de-multiplexing, slicing, presenting, providing controlled access or authentication, tracking, logging or counting or any other function contemplated herein in any setting or environment.

For example, a user with a mobile device may be in communication with a server configured to implement the system using the aforementioned elements, according to an embodiment of the present disclosure. The mobile device can be, for example, a multi-modal wireless communication device, such as a "smart" phone, configured to store and execute mobile device applications ("apps"). Such a wireless communication device communicates with a wireless voice or data network using suitable wireless communications protocols assuming the networks have the appropriate bandwidth to present data or real time images. Alternatively, the display system can be a computing and monitoring system with or without wireless communications as the case may be.

The system may include, inter alia, various hardware components such as processing circuitry executing modules that may be described in the general context of computer system-executable instructions, such as program modules, being executed by the system. Generally, program modules can include routines, programs, objects, components, logic, data structures, and so on that perform particular tasks or implement particular abstract data types. The modules may be practiced in various computing environments such as conventional and distributed cloud computing environments where tasks are performed by remote processing devices that are linked through a communications network. In a distributed cloud computing environment, program modules may be located in both local and remote computer system storage media including memory storage devices. Program modules generally carry out the functions and/or methodologies of embodiments of the present disclosure, as described above.

In some embodiments, a system includes at least one memory and at least one or more processor of a computer system communicatively coupled to the at least one memory. The at least one processor can be configured to perform a method including methods described above.

According to yet another embodiment of the present disclosure, a computer readable storage medium comprises computer instructions which, responsive to being executed by one or more processors, cause the one or more processors to perform operations as described in the methods or systems above or elsewhere herein.

Figure 9:
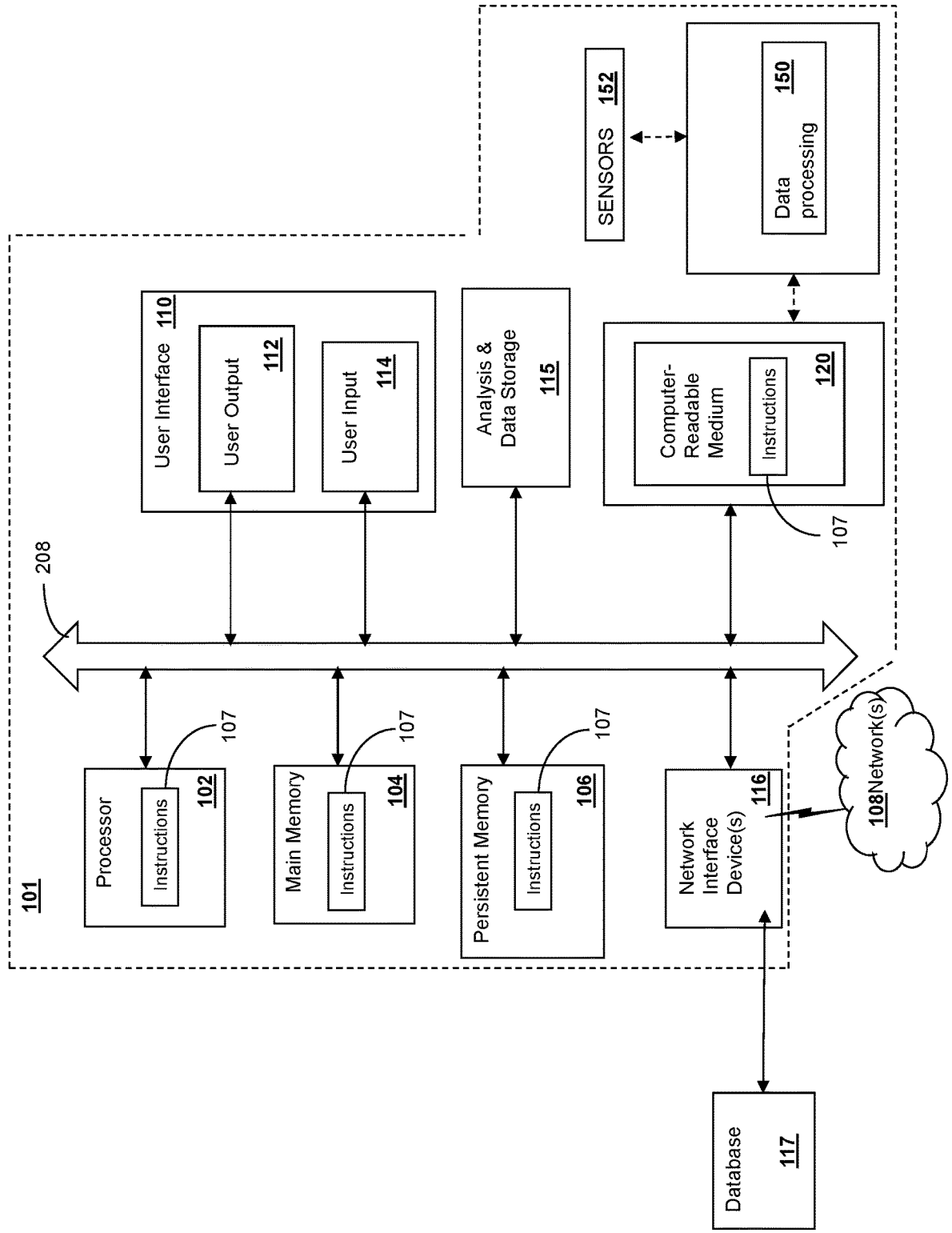
FIG. 9. is a block diagram of a computational architecture used by media streaming device to implement and execute the methods disclosed in accordance with the embodiments.

As shown in FIG. 9, an information processing system 101 of a system 200 can be communicatively coupled with the data processing module 150 and a group of client or other devices, or coupled to a presentation device for display at any location at a terminal or server location. According to this example, at least one processor 102, responsive to executing instructions 107, performs operations to communicate with the processing module 150 via a bus architecture 208, as shown. The at least one processor 102 is communicatively coupled with main memory 104, persistent memory 106, and a computer readable medium 120. The processor 102 is communicatively coupled with an Analysis & Data Storage 115 that, according to various implementations, can maintain stored information used by, for example, the data processing module 150 and more generally used by the information processing system 200. The data processing module 150 can be coupled to one or more sensors 152 as needed. Such sensors can be timers, barcode scanners, fingerprint readers, proximity sensors, microphones, cameras, video cameras, location sensors, motion detectors, biometric reading devices (e.g., iris scanners, facial recognition scanners, voice detection devices) and other devices as contemplated herein. Optionally, this stored information can be received from the client or other devices. For example, this stored information can be received periodically from the client devices and updated or processed over time in the Analysis & Data Storage 115. Additionally, according to another example, a history log can be maintained or stored in the Analysis & Data Storage 115 of the information processed over time. The data processing module 150, and the information processing system 200, can use the information from the history log such as in the analysis process and in making decisions related methods disclosed herein.

The computer readable medium 120, according to the present example, can be communicatively coupled with a reader/writer device (not shown) that is communicatively coupled via the bus architecture 208 with the at least one processor 102. The instructions 107, which can include instructions, configuration parameters, and data, may be stored in the computer readable medium 120, the main memory 104, the persistent memory 106, and in the processor's internal memory such as cache memory and registers, as shown.

The information processing system 200 includes a user interface (or interfaces) 110 that comprises a user output interface 112 and user input interface 114. Examples of elements of the user output interface 112 can include a display, a speaker, one or more indicator lights, one or more transducers that generate audible indicators, and a haptic signal generator or any of the interfaces illustrated or discussed with respect to the figures or elsewhere in the application. Examples of elements of the user input interface 114 can include a keyboard, a keypad, a mouse, a track pad, a touch screen, a touch pad, a microphone that receives audio signals, a camera, a video camera, a CT-Scanner, or any other scanner that scans images. Some user inputs can be sensors or vice-versa. The received audio signals or scanned images, for example, can be converted to electronic digital representations and stored in memory, and optionally can be used with corresponding voice or image recognition software executed by the processor 102 to receive user input data and commands, or to receive test data for example.

A network interface device 116 is communicatively coupled with the at least one processor 102 and provides a communication interface for the information processing system 100 to communicate via one or more networks 108. The networks 108 can include wired and wireless networks, and can be any of local area networks, wide area networks, or a combination of such networks. For example, wide area networks including the internet and the web can intercommunicate the information processing system 100 with other one or more information processing systems that may be locally, or remotely, located relative to the information processing system 100. It should be noted that mobile communications devices, such as mobile phones, Smart phones, tablet computers, lap top computers, and the like, which are capable of at least one of wired and/or wireless communication, are also examples of information processing systems within the scope of the present disclosure. The network interface device 116 can provide a communication interface for the information processing system 100 to access the at least one database 117 according to various embodiments of the disclosure.

The instructions 107, according to the present example, can include instructions for monitoring, instructions for analyzing, instructions for retrieving and sending information and related configuration parameters and data. It should be noted that any portion of the instructions 107 can be stored in a centralized information processing system or can be stored in a distributed information processing system, i.e., with portions of the system distributed and communicatively coupled together over one or more communication links or networks.

FIGS. 1-8 illustrate examples of systems, data formats, methods or process flows, according to various embodiments of the present disclosure, which can operate in conjunction with the information processing system 200 of FIG. 9.

What is claimed is:

1. A method comprising:
   identifying, by way of a media streaming device, one or more samples with a sample presentation time in an event message track;
   identifying one or more of the samples enclosing one or more Event Message Boxes containing information about a splice point;
   identifying that all of the one or more Event Message Boxes are active at the sample presentation time of the sample enclosing the Event Message Boxes; and
   parsing by way of the media streaming device, the event message track as an ISO Base Media Formatted Track.

2. The method of claim 1, wherein the information about the splice point comprises a SCTE-35 marker with a splice information table.

3. The method of claim 1, wherein the information about the splice point comprises a SCTE-35 marker with a splice information table carrying a splice insert command.

4. The method of claim 1, wherein the information about the splice point comprises a SCTE-35 marker with a splice information table carrying a splice insert command.

5. The method of claim 2, wherein the SCTE-35 marker is inserted in a DASH manifest using a Media Presentation Description according to a specification for SCTE 214-1.

6. The method of claim 1, wherein the information about the splice point comprises information regarding a cue-out of a main content stream occurring at a presentation time and a duration.

7. The method of claim 1, wherein the information about the splice point comprises information regarding a cue occurring at a presentation time of an event and a corresponding CUE-IN to return to original content occurs at presentation-time plus a duration of the event.

8. The method of claim 7, wherein the presentation time and the presentation time plus a duration of the event corresponds to intra decoder decoder refresh or key frames in associated media tracks.

9. The method of claim 1, wherein the information about the splice point enables an insertion of an ad.

10. A media streaming device acting as a splicer comprising:
    one or more processors;
    one or more memory devices coupled to the one or more processors, the one or more memory devices having computer instructions which when executed by the one or more processors causes the one or more processors to perform the operation of:
    identifying, by way of a media streaming device, one or more samples with a sample presentation time in an event message track;
    identifying one or more of the samples enclosing one or more Event Message Boxes containing information about a splice point;
    identifying that at least one of the one or more of the enclosed Event Message Boxes;
    identifying that all of the one or more Event Message Boxes are active at the sample presentation time of the sample enclosing the Event Message Boxes; and
    parsing by way of the media streaming device, the event message track as an ISO Base Media Formatted Track.

11. The streaming media device of claim 10, wherein the information about the splice point comprises a SCTE-35 marker with a splice information table.

12. The streaming media device of claim 10, wherein the information about the splice point comprises a SCTE-35 marker with a splice information table carrying a splice insert command.

13. The streaming media device of claim 10, wherein the information about the splice point comprises a SCTE-35 marker with a splice information table carrying a splice insert command.

14. The streaming media device of claim 11, wherein the SCTE-35 marker is inserted in a DASH manifest using a Media Presentation Description according to a specification for SCTE 214-1.

15. The streaming media device of claim 10, wherein the information about the splice point comprises the start time and duration of the splice point.

16. The streaming media device of claim 10, wherein the information about the splice point comprises information regarding a cue occurring at a presentation time of an event and a corresponding CUE-IN to return to original content occurs at presentation-time plus a duration of the event.

17. The streaming media device of claim 16, wherein the presentation time and the presentation time plus a duration of the event corresponds to intra decoder decoder refresh or key frames in associated media tracks.

18. The streaming media device of claim 10, wherein the information about the splice point enables an insertion of an ad.

19. A method, comprising:
- parsing, by a media streaming device, one or more Event Message Boxes as top level boxes in a media track, wherein the Event Message Boxes contains information about a splice point;
- identifying by one or more processors coupled to the media streaming device, a duration, a presentation time, an id, a value and a scheme_id_uri for each of the one or more Event Message Boxes;
- instantiating by the one or more processors an event message track as an ISO Base Media Format track;
- traversing by the one or processors the one or more Event Message Boxes by an order of increasing presentation time;
- instantiating by the one or more processors a new sample for each uniquely identified instance of the one or more Event Message Boxes having a distinct presentation time, the new sample presentation time being the distinct presentation time; and
- enclosing by the one or more processors each of the Event Message Boxes active at each of the distinct presentation times each of the instantiated samples.

20. The method of claim 19, wherein the information about the splice point comprises a SCTE-35 marker.

* * * * *